US007568858B2

(12) United States Patent
Viitasalo et al.

(10) Patent No.: US 7,568,858 B2
(45) Date of Patent: Aug. 4, 2009

(54) FEEDER HOPPER, A METHOD FOR LOCKING THE WALLS OF A FEEDER HOPPER AND A LOCKING MEANS

(75) Inventors: Markku Viitasalo, Tampere (FI); Tero Majuri, Tampere (FI); Saku Vuorela, Tampere (FI); Pasi Kojo, Ylinen (FI); Pekka Lehtonen, Kangasala (FI)

(73) Assignee: Metso Minerals Inc., Helsinki (FI)

( * ) Notice: Subject to any disclaimer, the term of this patent is extended or adjusted under 35 U.S.C. 154(b) by 656 days.

(21) Appl. No.: 11/175,281

(22) Filed: Jul. 7, 2005

(65) Prior Publication Data

US 2006/0016104 A1 Jan. 26, 2006

(30) Foreign Application Priority Data

Jul. 7, 2004 (FI) ................................ 20045268

(51) Int. Cl.
*B60P 1/00* (2006.01)

(52) U.S. Cl. ........................................ 404/110; 298/25

(58) Field of Classification Search .................. 37/403, 37/412; 299/95; 404/110; 298/24, 25
See application file for complete search history.

(56) References Cited

U.S. PATENT DOCUMENTS

| | | | | |
|---|---|---|---|---|
| 5,263,422 | A * | 11/1993 | Barefoot | 105/308.1 |
| 5,584,251 | A * | 12/1996 | Lucas | 105/305 |
| 7,004,411 | B2 * | 2/2006 | Nuora et al. | 241/101.74 |
| 7,185,953 | B1 * | 3/2007 | Young | 298/24 |

FOREIGN PATENT DOCUMENTS

| | | |
|---|---|---|
| JP | A 09-206624 | 8/1997 |
| JP | A 09-313971 | 12/1997 |

* cited by examiner

*Primary Examiner*—Gary S Hartmann
(74) *Attorney, Agent, or Firm*—Oliff & Berridge, Plc.

(57) ABSTRACT

Feeder hopper for a movable mineral material processing device, whose walls are arranged to be turned upward to a working position, and which are locked into said working position. To lock the walls, there is at least one locking means in connection with them, said locking means containing at least a locking member and transfer means. According to the method the locking member is transferred to the locking position with the transfer means.

15 Claims, 4 Drawing Sheets

FEEDER HOPPER, A METHOD FOR LOCKING THE WALLS OF A FEEDER HOPPER AND A LOCKING MEANS

CROSS-REFERENCE TO RELATED APPLICATIONS

This application claims priority under 35 USC §119 to Finnish Patent Application No. 20045268 filed on Jul. 7, 2004.

FIELD OF THE INVENTION

The invention relates to a feeder hopper for a mobile mineral material processing device, a method for locking the walls of the feeder hopper of a mineral material processing device into a working position and a locking means.

BACKGROUND OF THE INVENTION

Mineral material processing devices are typically used for feeding, conveying, crushing, screening or washing mineral materials. Typically such a processing device comprises a frame and at least one processing unit suitable for processing of mineral materials, for example a feeder, a belt conveyor, a crusher, a screen, or a corresponding device for transferring, refining or sorting mineral material. Often two or several processing units are integrated in the same frame, thus attaining a device suitable for versatile processing of mineral material.

Often such mineral material processing devices are designed so that they can be transported between different working sites or at least within one working site. Thus, the frame of the mineral material processing device is often provided with runners, wheels or tracks. Mineral material processing devices are often also provided with an independent power source, for example a diesel motor that is connected to wheels or tracks underneath the frame, thus attaining a movable device that is capable of moving independently.

When a new movable mineral material processing device is designed, the objectives of the design work is in addition to the processing efficiency and productivity that the processing device can be transported and used easily and safely. Sometimes these objectives are contradictory, and the designers must resort to compromises. For example, a high level of productivity requires the use of productive, large-sized processing units in the mineral material processing device. However, the use of such units makes the entire processing device large in size and difficult to transport not only inside the working site, but also between different working sites.

There are several patent publications known in the world, which disclose inventions with the aim of facilitating the mobility of various kinds of mineral material processing devices. Such publications include for example EP 1 110 625 A2, DE 198 05 378 A1, WO 98/46472 A1, WO 90/08720 WO 2004/018106 A1 and FI 109662 B.

Finnish patent publication FI 109662 B discloses a mobile mineral material processing device, in which the processing units include a vibrating feeder, a jaw crusher, two belt conveyors and a magnetic separator. The device comprises a power source of its own as well as tracks connected to the frame of the device, by means of which it is possible to transport the unit in the working site, and drive it for example on the platform of a truck for road transport between different working sites. Furthermore, in the upper part of the device there is a feeder hopper in which the material to be processed is fed and from which a vibrating feeder transfers the material to a crusher. To facilitate the mobility of the device as well as to attain a height of the cargo that is below the maximum cargo height allowed for road transports, the feeder hopper is composed of walls which can be turned downward and are hinged to the frame of the device. The publication shows an inventive transport locking of a vibrating feeder that facilitates and speeds up the process of bringing the presented crushing device from the working position to the transport position.

In mineral material processing devices in which a feeder hopper which comprises turning walls is located in the upper part of the device, there are still some unsolved problems relating to the easy and safe mounting of the feeder hopper in a situation in which the feeder hopper of the processing device is transferred from the transport position to the working position or vice versa, from the working position to the transport position.

The feeder hopper of the mineral material processing device receives strong impacts, when big stones are fed into the feeder hopper. Such impacts may also be exerted on the feeder hopper for other reasons, for example when a device that is feeding the processing device, such as the bucket of an excavator or a bucket loader hits the feeder hopper by accident. Thus, the feeder hopper must be manufactured so that it becomes very firm. At the same time it becomes heavy.

The feeder hopper is supported against the main frame of the mineral material processing device, wherein the impacts exerted on the feeder hopper are also exerted on the main frame of the mineral material processing device. Thus, this main frame must also be manufactured to be very firm. At the same time it becomes heavy as well. Often the feeder hopper is supported against the main frame by means of a separate feeder module frame. The same requirements as those directed to the main frame are directed thereto, i.e. it must be very firm and it must have a strong structure. At the same time it is often very heavy.

The mounting of the feeder hopper, i.e. the turning of the heavy walls of the feeder hopper around their hinges to the working position and the locking of the walls to each other is a slow, difficult and dangerous work stage. In the most developed processing devices for mineral materials currently on the market the walls of the feeder hopper can be turned by means of hydraulic cylinders in such a manner that the turning of them from the transport position to the working position and back is easy. However, the impacts exerted on the walls of the feeder hopper cannot be received with mere hydraulic cylinders. Thus, the walls of the hopper must be locked to the working position separately. Conventionally this has been done by means of firm and heavy wedges by means of which the walls are locked so that they do not move with respect to each other and the frame of the processing device for mineral material or the frame of the feeder module. The wedges have been used especially for locking the wall of the feeder hopper and the frame of the processing device for mineral materials, but also for locking the separate walls of the feeder hopper to each other.

Up until now the transferring of the feeder hopper of a processing device for mineral materials from the working position to the transport position or back has required the climbing of the user up to the hopper to install or remove the locking wedges. In quarry conditions working high up with heavy wedges as well as working between the frame and the heavy wall of the hopper that is attached by means of hinges to the frame is a safety risk.

In present feeder hoppers there also occurs a problem that the impacts exerted on the feeder hopper, either the impacts on the walls caused by the stones fed into the feeder hopper or other kinds of impacts affect the frame of the processing device, thus causing impacts and vibration therein. As a result of this the frame structure of the processing device itself and all the other structures relating thereto become fatigued and rupture as time goes on. Furthermore, the impacts and the vibration may cause damage to the sensitive components of the processing units and auxiliary devices installed on the frame.

BRIEF DESCRIPTION OF THE INVENTION

The purpose of the present invention is thus to attain a durable and reliable processing device of mineral materials comprising a feeder hopper with turning walls that can be installed from the transport position to the working position and back easily and safely.

The invention is based on the idea that the walls of a feeder hopper are locked to a working position with locking means, which can be brought to the locking position without the presence of the user of the processing device near the wedges. In other words, it is not necessary for the user to climb up to the hopper to install or remove the locking wedges belonging to the locking means. According to the invention the locking means include transfer means by means of which the locking means can be transferred to the locking position. The locking means are installed outside the wall of the feeder hopper in a stationary manner, and they contain a locking means that cause the locking, i.e. a movably installed locking wedge and transfer means for transferring the locking wedge to the locking position and out of the same. If desired, the transfer means can be connected to an electrical or hydraulic control system of the processing device, wherein the locking of the walls of the feeder hopper to the working position and the unlocking can be performed by utilizing the control system of the processing device, for example from the control cabin or by means of remote control.

The locking wedge is also provided with a elastic part that is made for example of rubber, said part attenuating the impacts directed to the walls of the feeder hopper that are caused by the feeding of the mineral material, such as rocks.

It is an advantage of the invention that the walls of the feeder hopper can be installed and locked from the transport position to the working position and back from a safe place that is located further away from the locking means, without risking the user to physical danger. The locking can also take place by utilizing the control system of the processing device. Furthermore, by means of the elastic part located in the locking means it is possible to attenuate the impacts exerted on the walls of the feeder hopper in such a manner that they do not cause strong impacts and vibration on the frame of the processing device.

BRIEF DESCRIPTION OF THE DRAWINGS

In the following, the invention will be described in more detail with reference to the appended drawings, in which.

Figure 1:
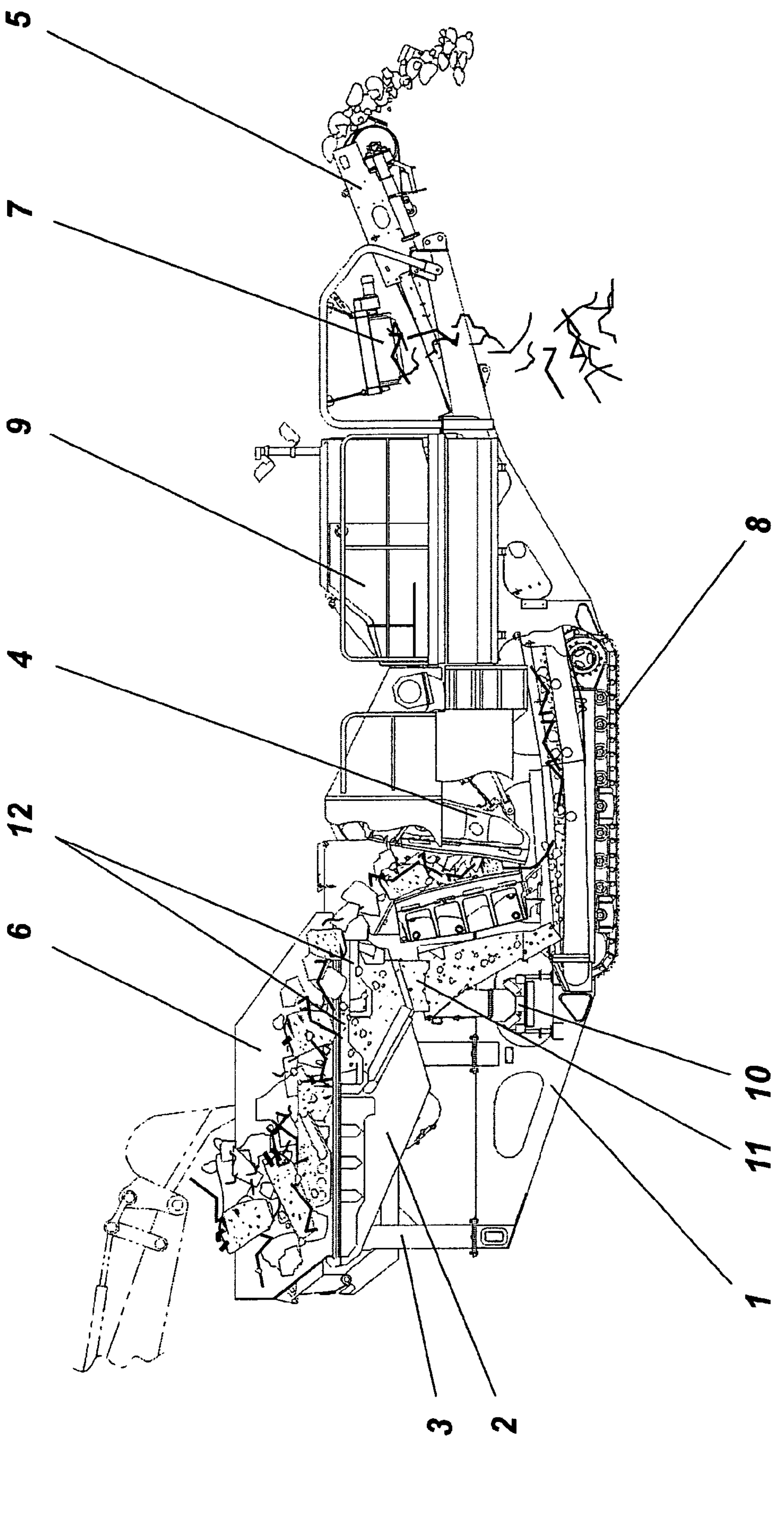
PRIOR ART Fig. 1
FIG. 1 shows a mobile mineral material processing device in a side view, partly cut open.

The main parts of the mineral material processing devices according to FIGS. 1 to 6 include:

main frame 1
feeder 2
frame 3 of the feeder module
crusher 4
main conveyor 5
feeder hopper 6
magnetic separator 7
tracks 8
power source 9
side conveyor 10
separating chute 11
grizzly section 12
wall 21 of the feeder hopper
wall 22 of the feeder hopper
wall 23 of the feeder hopper
hinge 24 of the wall of the feeder hopper
opening 25
bracket 26
locking wedge 27
locking pin 28
lifting lug 29
locking member, i.e. locking wedge 31
transfer means 32
counter surface 33 of the locking wedge located against the wall of the feeder hopper
counter surface 34 of the locking wedge located against the frame of the feeder module
rear plate 35 of the locking wedge
guiding grooves 36 of the locking wedge
fastening and guiding means 37 of the locking wedge
front plate 41 of the locking wedge
first fastening means 42 of the transfer means
elastic element 43
second fastening means 51 of the transfer means
elastic element 52
elastic element 53
control means 54 of the elastic element
locking means L

DETAILED DESCRIPTION OF THE INVENTION

FIG. 1 shows a typical prior art mineral material processing device which has been partly cut open in such a manner that the running of the material inside the device can be more easily detected. The main frame 1 of the device is provided with units participating in the processing of mineral material, i.e. a feeder 2, a crusher 4, a main conveyor 5, and a side conveyor 10. In this case the feeder 2 is positioned on the main frame 1 via the separate frame 3 of a feeder module. The device has a power source 9 of its own that can be for example a diesel engine. The power source drives all processing units of the device by means of electric, mechanical or hydraulic power transmission (not shown). By means of the power source the entire device can move on its tracks 8.

In the example according to the figure an excavator feeds the mineral material processing device with construction waste that in addition to concrete blocks contains reinforcement bars used for reinforcing the concrete. The feed material is fed to the feeder hopper 6 underneath of which the feeder 2 is positioned. In this case the feeder is a vibrating feeder that feeds the feed material as a constant flow into the crusher 4. At the final end of the feeder there is a grizzly section 12 that separates from the feed material the fine-grained substance harmful for the crusher before the feed material enters the crusher 4. By means of a separating chute 11 the fine-grained substance separated by the grizzly section 12 can be guided away from the processing device either to the side conveyor 10 or—as shown in the figure to the main conveyor 5. In this case both the side conveyor 10 and the main conveyor 5 are belt conveyors.

The crusher 4 reduces the grain size of the feed material. The crushed material falls from the opening of the crusher on the main conveyor 5 that conveys the finished crushed material out of the processing device. The process according to the figure also comprises a magnetic separator 7 that separates the reinforcement bars from the crushed concrete and conveys them out of the processing device to another pile than the crushed concrete.

Figure 2:
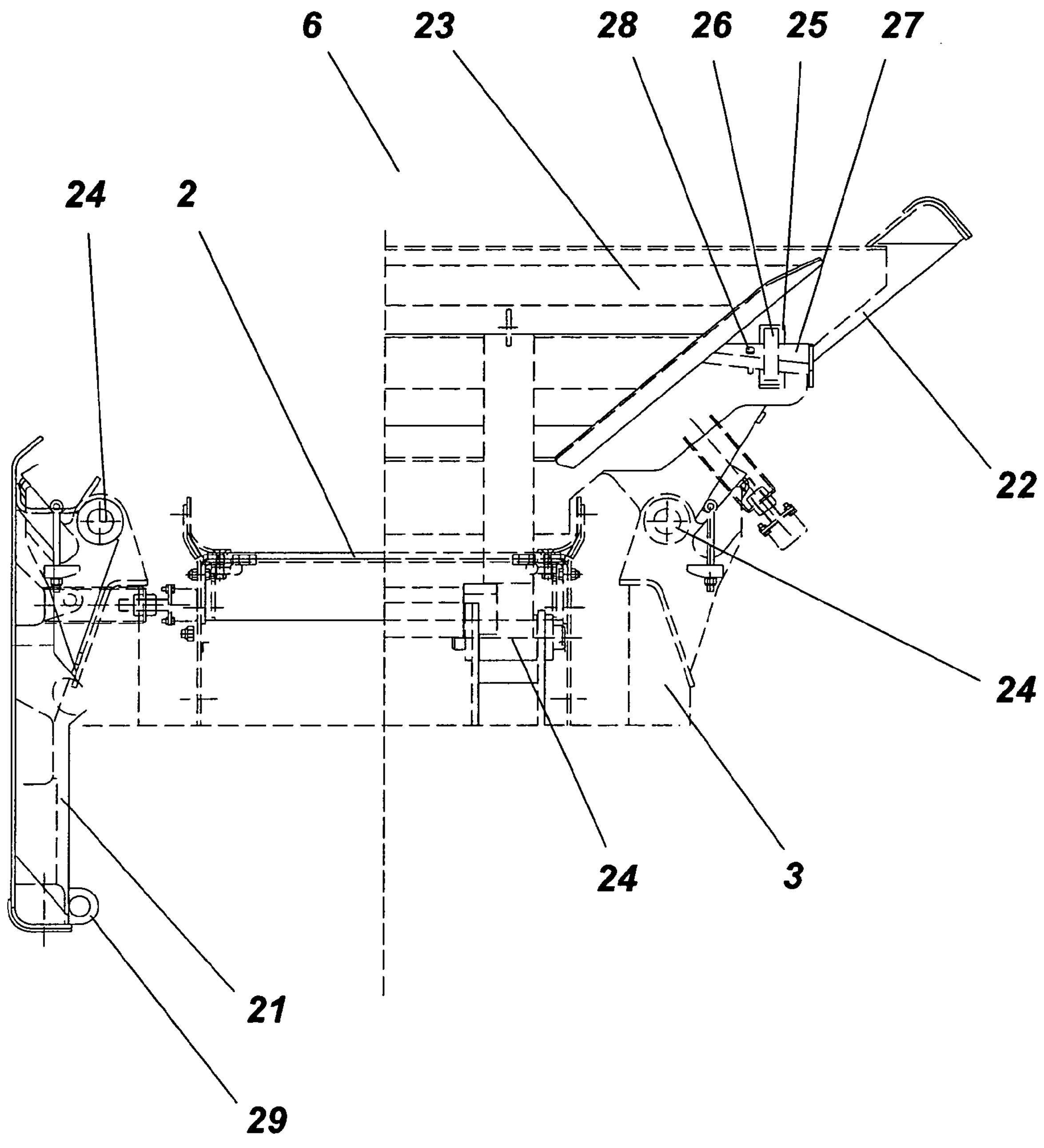
PRIOR ART Fig. 2
FIG. 2 shows in more detail a feeder hopper of the mineral material processing device of FIG. 1 in a rear view.

FIG. 2 shows in more detail the feeder hopper 6 of the mineral material processing device according to FIG. 1 when seen from behind the mineral material processing device in the travel direction of the feed material. In the situation shown in the figure the feeder hopper 6 is composed of three walls, a left wall 21, a right wall 22 and a rear wall 23, attached to the frame 3 of the feeder module in a turnable manner by means of hinges 24. To illustrate the function of the walls, the right side of the rear wall 23 and the right wall 22 are drawn in working position, i.e. upward, and the left wall 21 is drawn in the transport position, downward. In the working position the walls are tilted upward from the horizontal plane into an angle of 15 to 75 degrees, advantageously into an angle of 30 to 60 degrees so that the feed material fallen on the wall rolls therefrom to the feeder 2.

The bottom of the feeder hopper 6 is open in such a manner that the material fed to feeder hopper falls directly on top of the feeder 2.

When the feeder hopper is installed in the working position its walls are rotated around their hinges one at a time up to the working position. This may take place for example by lifting the wall with the lifting device by a lifting accessory attached to the lifting lug 29. Alternatively, for this purpose it is possible to install a hydraulic cylinder (not shown) between the frame of the feeder module and the wall, said hydraulic cylinder rotating the wall around its hinge.

FIG. 2 shows how the rear wall 23 of the feeder hopper is provided with an opening 25 in which the bracket 26 of the right wall is positioned when the walls are in the working position. The bracket 26 is provided with an opening in which a locking wedge 27 is installed when the walls are locked into the working position. The wedge is locked in its place by means of a locking pin 28.

The locking of the walls of the hopper into the working position in the above-described manner is manual work. The bracket 26 on the wall and the locking wedge 27 are located quite high above the ground, wherein there is a risk of falling involved in the installation of the wedge. When installing the wedge, it is necessary to work underneath the upward lifted wall. If an error occurs in the lifting of the wall, and the wall 21, 22, 23 can rotate down by gravity around its hinge, there is a risk that the person installing the wedge 27 in its place becomes squeezed between the heavy wall and the feeder 2 or between the wall and the frame 3 of the feeder module.

Figure 3:
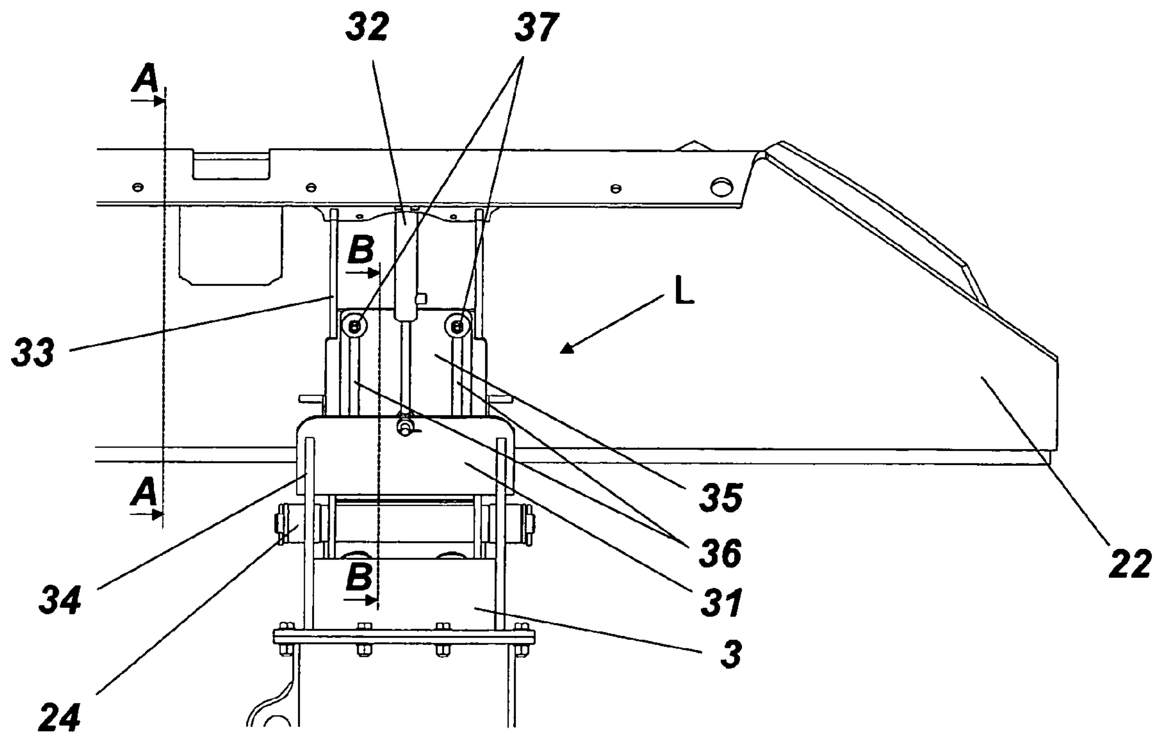
FIG. 3 shows a wall of the feeder hopper according to the invention lifted up into the working position, when seen from outside the feeder hopper, a locking means being attached to said wall.
Figure 4:
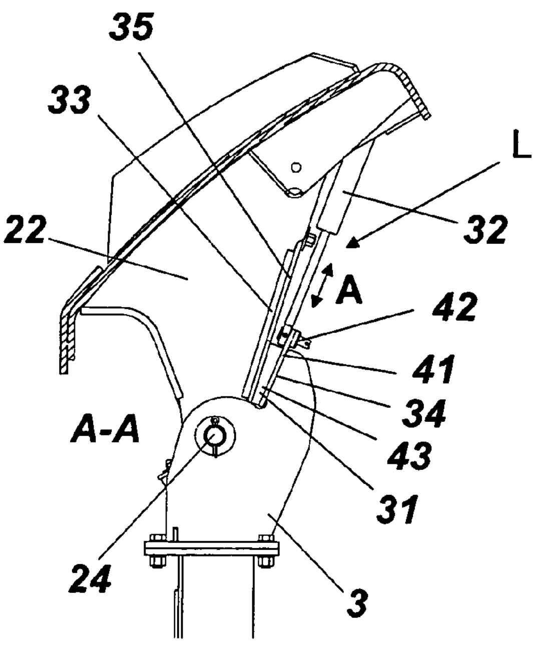
FIG. 4 shows a section A-A of FIG. 3.
Figure 5:
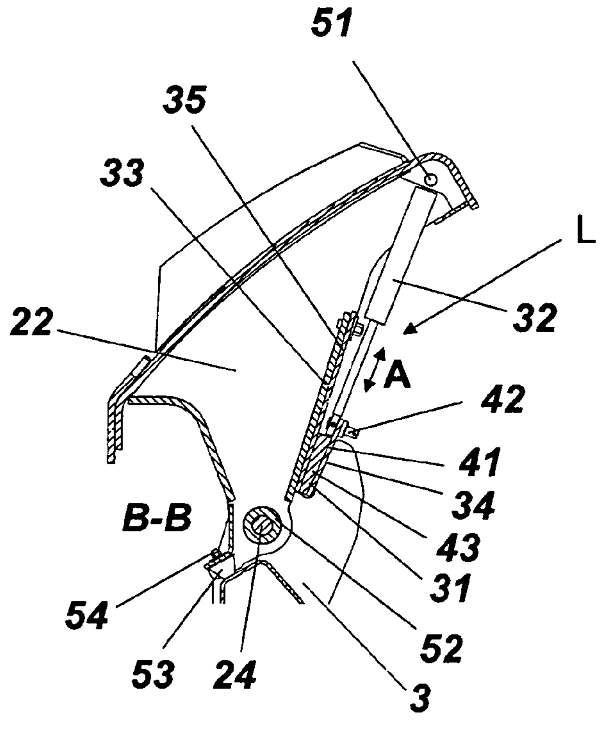
FIG. 5 shows a section B-B of FIG. 3.

FIGS. 3 to 5 show the details of the feeder hopper according to an embodiment of the invention, when the wall 22 of the feeder hopper is lifted up to the working position. FIGS. 3 to 5 will be described in more detail later in this description.

Figure 6:
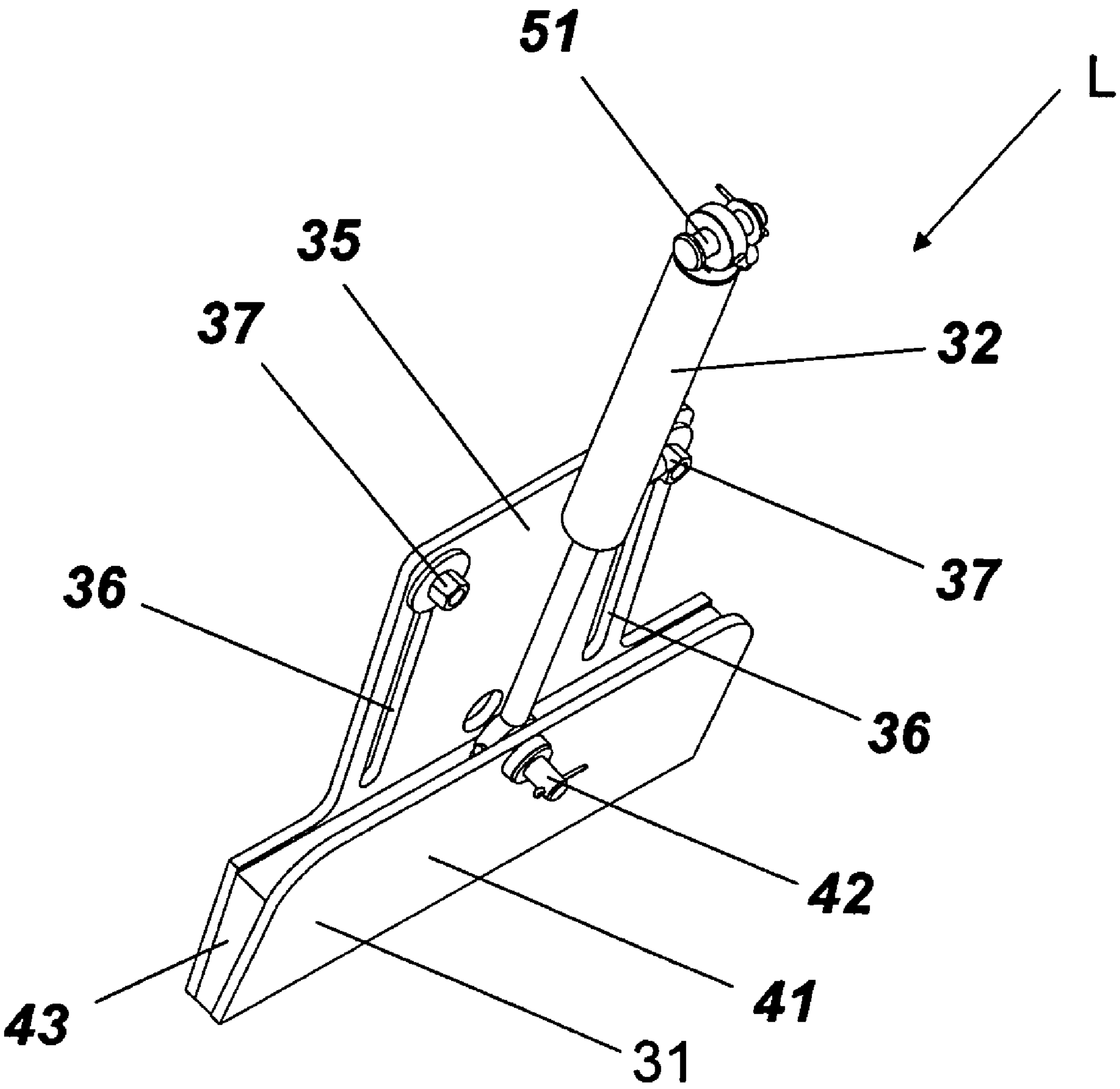
FIG. 6 shows a locking means in a perspective view.

FIG. 6 shows a locking means L which comprises a locking member 31, i.e. a locking wedge and transfer means 32. The first wedge surface of the locking wedge 31 i.e. the rear plate 35 is provided with guiding means, i.e. guiding grooves 36, to which the fastening and guiding means 37 of the locking wedge are positioned, said fastening and guide means 37 allowing the sliding of the locking wedge 31 on the counter surface 33 of the wall 22 (shown in FIGS. 3 to 5) in the vertical direction of the wall, but they prevent the lateral movement of the wedge 31 with respect to the wall 22. The other wedge surface of the wedge 31 i.e. the front plate 41 is in contact with the counter surface 34 formed in the frame 3 of the feeder module. The locking means L also includes transfer means 32 fastened to the front plate 41 of the locking wedge by fastening means 42. The transfer means produce the substantially vertical movement of the locking wedge 31. In this embodiment a double-acting hydraulic cylinder is presented as an example to be used as transfer means 32. The transfer means 32 can, of course, be any hydraulic, pneumatic or electrically operating actuator. Similarly, the transfer means can also be connected to a hydraulic, pneumatic or electric control system of the processing device.

If an hydraulic cylinder is used as transfer means, it can be coupled to the hydraulic system (not shown) of the mineral material processing device in a generally known manner so that the moving of the locking wedge 31 to the locking position and out of it can be performed from a safe location further away from the locking wedge 31 and the walls 21, 22, 23 than has been possible in solutions known so far. It is, for example, possible to control the movement of the transfer means 32 and thereby the movement of the locking wedge 31 via the control system of the mineral material processing device. During the processing of the mineral material it is possible to monitor the pressure of the hydraulic cylinder 32 by means of the control system (not shown) of the mineral material processing device in such a manner that the pressure prevailing in the cylinder is constant or the variation of the pressure is thus allowed only within predetermined limits. Thus, it is possible to ensure that the locking wedge 31 remains in its place in all situations.

The front and rear plates 41 and 35 of the locking wedge are made of hard, wear-proof material, for example of steel. Advantageously, there is a elastic part 43 between these that attenuates the impacts exerted on the walls 21, 22, 23 during the processing work of the mineral material. Thus, the impacts are not exerted as strongly on the frame of the feeder module 3 and the main frame 1 of the mineral material processing device as before. Thus, it is possible to improve the durability and lifetime of the walls 21, 22, 23 themselves, the frame 3 of the feeder module and the main frame 1 of the mineral material processing device. The elastic part 43 is advantageously made of rubber or other resilient material that has been vulcanized, glued or otherwise attached to the front and rear plates 41, 35 of the wedge 31. The hardness of the rubber used in the elastic part 43 must be selected in accordance with the type of work for which the processing device for mineral materials is intended, and what kind of impacts can be expected in the hopper in this work. For example rubber whose hardness is "shore 60" is in some applications suitable material for this purpose. It is, of course, possible to use other kinds of generally known resilient, elastic materials, such as polyurethane, instead of rubber.

The locking wedge 31 can also be formed of a continuous element in such a manner that separate parts such as front and rear plates and a flexible part cannot be distinguished therefrom. Thus, the locking wedge can be for example a continuous metal element.

FIGS. 3 to 5 show a locking means L attached to the outer surface of the wall 22 of the feeder hopper. FIGS. 4 and 5 show sections A-A and B-B marked in FIG. 3. In the above-mentioned figures the locking member 34 is in the locking position, i.e. the wall is wedged immobile with respect to the frame of the feeder module.

The locking wedge 31 is attached in a slidable manner to the wall 22 of the feeder hopper. The path of the transfer means of the locking wedge 31 is in FIGS. 4 and 5 shown by means of an arrow A. The transfer means 32 are used for lifting the locking wedge 31 away from the space formed for the same between the wall 22 and the frame 3 of the feeder module in such a manner that the wall can be turned freely around its hinge 24 down to the transport position. The transfer means 32 are attached from their one end to the wall 22 with fastening means 51 and from the other end to the locking wedge 31 with fastening means 42, which fastening means allow the moving of the wedge with respect to the wall 22 back and forth in the direction of the stroke of the cylinder 32.

Controlling of the movement of the locking wedge 31 on the surface of the wall 22 can also be arranged in other ways than that shown in FIGS. 3 to 6. To control the wedge, it is possible to provide the wall of the feeder hopper with projections, rails or grooves, or similarly, the wedge can be provided with corresponding parts that guide the movement of the wedge 31 along the wall produced by the transfer means.

The invention is not intended to be limited to the embodiments presented as examples above, but the invention is intended to be applied widely within the scope of the inventive idea as defined in the appended claims.

Thus, the invention is not restricted to the number of locking means bringing about the locking between the walls of the feeder and the frame of feeder module: there may be one or several means bringing about the locking on each downward turning wall of the feeder hopper. The invention is not restricted to any specific number of walls either.

The invention is not restricted to any specific way of moving the side walls of the feeder hopper either. The side walls of the feeder hopper can be lifted up by means of a separate lifter, and lowered down by means of gravity. The invention is implemented best in mineral material processing devices, in which the walls of the feeder hopper can be moved by means of hydraulic cylinders, wherein it is possible to eliminate all manual work stages from the process of transferring the walls of the feeder from the transport position to the working position and vice versa.

The invention is not restricted to such mineral material processing devices whose frame has been divided into a separate main frame and a feeder module frame. These can also form one common frame.

Furthermore, the invention is not limited to any particular technology of moving a mobile mineral material processing device. The device can be, for example, mounted on runners, wheels or tracks. It can be moved by means of an external transfer device or it can be a device capable of moving independently.

The invention is not restricted to the handling of any specific mineral material either. The mineral material can be ore, blasted rock or gravel, different kind of recyclable construction waste, such as concrete, tile or asphalt. The invention is not restricted to situations in which mineral materials are processed with a device suitable for processing of mineral materials: by means of such devices it is also possible to process many other feed materials, such as different kinds of soils and industrial products, side products or waste.

The invention is not restricted to any specific feeder positioned underneath the feeder hopper. In addition to a vibrating feeder, the feeding device can be for example an apron feeder, a carriage feeder or a feed conveyor.

The invention claimed is:

1. A feeder hopper for a mobile mineral material processing device, whose walls are arranged to be turned downward to a transport position and to be turned and locked upward to a working position, in connection with said walls there is at least one locking means for locking the walls of the feeder hopper in said working position substantially immovably with respect to a frame of the feeder module, wherein the locking means comprises at least a locking member and transfer means, which transfer means are arranged to move the locking member into the locking position and in the locking position the locking member is positioned between the frame of the feeder module and a wall of the feeder hopper.

2. The feeder hopper according to claim 1, wherein the transfer means are arranged to move the locking member out of the locking position.

3. The feeder hopper according to claim 1, wherein the locking means is attached to the wall of the feeder hopper.

4. The feeder hopper according to claim 1, wherein the transfer means is one of the following: a hydraulic, pneumatic or electric actuator.

5. The feeder hopper according to claim 1, wherein the locking member comprises a front plate and a rear plate between which there is an elastic element.

6. The feeder hopper according to claim 1, wherein the locking member is composed of one continuous element.

7. The feeder hopper according to claim 5, wherein guiding means are arranged in connection with the surface of the locking member and the surface of the wall of the feeder hopper that are in contact with each other to guide the locking member in accordance with the transfer motion of the transfer means.

8. The feeder hopper according to claim 1, wherein the transfer means are arranged to be controlled through the control system of the mineral material processing device.

9. A method for locking the walls of a feeder hopper of a mobile mineral material processing device comprising the steps of:

(i) arranging walls of a feeder hopper to a downward transport position and to an upward working position; and (ii) locking said walls into said working position such that said walls are substantially immovable with respect to the frame of a feeder module by means of at least one locking means, wherein the locking means comprises at least a locking member and transfer means, with which transfer means the locking member is moved into the locking position and the locking member is positioned between the frame of the feeder module and a wall of the feeder hopper.

10. The method according to claim 9, wherein the locking member is transferred out of the locking position with the transfer means.

11. The method according to claim 9, wherein the locking means are attached to the wall of the feeder hopper and to bring the locking means into the locking position the locking member is transferred between the frame of the feeder module and the wall of the feeder hopper.

12. The method according to claim 9, wherein the transfer means is one of the following: a hydraulic, pneumatic or electric actuator.

13. The method according to claim 9, wherein the locking member comprises a front plate and a rear plate, between which there is an elastic element and that guiding means are arranged in connection with the surface of the locking member and the surface of the wall of the feeder hopper that are in contact with each other, by means of said guiding means the locking member is guided in accordance with the transfer motion of the transfer means.

14. The method according to claim 9, wherein the locking member is composed of one continuous element and that guiding means are arranged in connection with the surface of the locking member and the wall of the feeder hopper that are in contact with each other, by means of said guiding means the locking member is guided in accordance with the transfer motion of the transfer means.

15. The method according to claim 9, wherein the transfer means are controlled through the control system of the mineral material processing device.

* * * * *